United States Patent
Bansod et al.

(10) Patent No.: US 12,170,619 B1
(45) Date of Patent: Dec. 17, 2024

(54) NETWORK CONGESTION CONTROL SIGNALING ON NETWORK DEVICES

(71) Applicant: Google LLC, Mountain View, CA (US)

(72) Inventors: Neelesh Bansod, San Jose, CA (US); Abhiram Ravi, Sunnyvale, CA (US); Arjun Singhvi, Sunnyvale, CA (US); Nandita Dukkipati, Palo Alto, CA (US); Hassan Mohamed Gamal Hassan Wassel, San Jose, CA (US); Masoud Moshref Javadi, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/240,851

(22) Filed: Aug. 31, 2023

(51) Int. Cl.
  *H04L 47/12* (2022.01)
  *H04L 47/2441* (2022.01)
  *H04L 47/25* (2022.01)

(52) U.S. Cl.
  CPC .......... *H04L 47/12* (2013.01); *H04L 47/2441* (2013.01); *H04L 47/25* (2013.01)

(58) Field of Classification Search
  CPC ... H04L 47/12; H04L 47/129; H04L 47/2441; H04L 47/25
  See application file for complete search history.

(56) References Cited

U.S. PATENT DOCUMENTS

| | | | |
|---|---|---|---|
| 8,811,183 B1 * | 8/2014 | Anand | H04L 49/505 370/237 |
| 9,444,754 B1 * | 9/2016 | Noureddine | H04L 47/31 |
| 2004/0052212 A1 * | 3/2004 | Baillargeon | H04L 47/22 370/328 |
| 2012/0051216 A1 * | 3/2012 | Zhang | H04W 28/12 370/230 |
| 2014/0153387 A1 * | 6/2014 | Wu | H04L 47/36 370/252 |
| 2014/0223053 A1 * | 8/2014 | Yoshida | G06F 13/362 710/110 |
| 2015/0295827 A1 * | 10/2015 | Zhu | H04L 47/283 370/230 |
| 2023/0362099 A1 * | 11/2023 | Tilmans | H04L 47/28 |

FOREIGN PATENT DOCUMENTS

| | | | | |
|---|---|---|---|---|
| CN | 108965121 A | * | 12/2018 | ........... H04L 45/123 |
| EP | 3442180 B1 | * | 11/2020 | ............. H04L 43/16 |

OTHER PUBLICATIONS

US 11,711,311 B2, 07/2023, Wang et al. (withdrawn)

* cited by examiner

*Primary Examiner* — Rachel J Hackenberg
(74) *Attorney, Agent, or Firm* — Lerner David LLP

(57) ABSTRACT

Congestion control by adding a congestion signal tag header to each of one or more transmission packets prior to transmission of the transmission packets by the first node to a second node, the congestion signal tag header specifying one or more congestion signal types and, for each of the congestion signal types, specifying a congestion signal value by providing an initial congestion signal value for the congestion signal value; receiving one or more return packets generated by the second node in response to receipt of the transmission packets, the return packets including a congestion signal reflection header having one or more return congestion signal values, and the return congestion signal values corresponding respectively to the congestion signal types; and determining whether transmission rate control is necessary based on the return congestion signal values.

19 Claims, 5 Drawing Sheets

360

TCP header format

NETWORK CONGESTION CONTROL SIGNALING ON NETWORK DEVICES

BACKGROUND

Many network control loops, such as congestion control, traffic engineering and network operations, make decisions based on the congestion experienced by application flows. However, the signals currently used to determine congestion are often implicitly derived from end-to-end signals, approximated over larger timescales than desired, or obtained out-of-band from the network, which leads to poor congestion control and the attendant drawbacks of suboptimal application performance and inefficient network usage. At the same time, applications are becoming more demanding, and their appetite for fast network performance is rising. For example, many newer artificial intelligence/machine learning (AI/ML) applications require fast network transfers to avoid idling expensive tensor processing units (TPUs) and graphics processing units (GPUs). Similarly, storage disaggregation requires fast network transfers to make a remote storage device appear local.

BRIEF SUMMARY

It has been recognized that without explicit information from networks, end-to-end congestion control algorithms (CCAs) have come to rely on heuristics that can either undershoot or overshoot the bottleneck bandwidth, which can lead to slower flow completion times (FCTs), increased round-trip times (RTTs), and/or packet losses. It has been further recognized that there continue to be blind spots for current CCAs regarding opportunities to increase flow rates. For example, current CCAs are deficient as to determining the appropriate starting rate for a flow and the rate at which flow can increase without experiencing congestion.

In view of the desire for improved CCAs, the presently disclosed technology is provided.

In accordance with the presently disclosed technology, a network node is configured to enable congestion control of network traffic using congestion signaling across a variety of hosts executing congestion control algorithms relying on provided congestion signals. The configured node, e.g., a network interface card (NIC) of a data center or host machine, can facilitate congestion control to reduce network bottlenecks, while allowing the network to communicate at line rate. The technology provides compare-and-replace support for congestion signal values that are reported in the same packets as that of a running application, so as to maintain the size of the packets through which the values are reported and thereby minimize the burden that congestion control signaling places on the network. In addition, the technology provides access to a variety of different congestion signals that may be used as input by implemented CCAs, to manage packets on a per-connection basis, or even a per-packet basis. Apropos, a node can make decisions on congestion control using selected signals which provide information related to, for example, a minimum available path bandwidth and load, and max hop delay.

In one aspect, the presently disclosed technology provides a congestion control system including one or more processors of a first node, the one or more processors configured to control adding a congestion signal tag header to each of one or more transmission packets prior to transmission of the transmission packets by the first node to a second node, the congestion signal tag header specifying one or more congestion signal types and, for each of the congestion signal types, specifying a congestion signal value by providing an initial congestion signal value for the congestion signal value; receiving one or more return packets generated by the second node in response to receipt of the transmission packets, the return packets including a congestion signal reflection header having one or more return congestion signal values, and the return congestion signal values corresponding respectively to the congestion signal types; determining whether transmission rate control is necessary based on the return congestion signal values; and when transmission rate control is necessary, controlling a transmission rate for transmission of packets from the first node to the second node.

In another aspect, the present disclosure provides a congestion control method including adding a congestion signal tag header to each of one or more transmission packets prior to transmission of the transmission packets by the first node to a second node, the congestion signal tag header specifying one or more congestion signal types and, for each of the congestion signal types, specifying a congestion signal value by providing an initial congestion signal value for the congestion signal value; receiving one or more return packets generated by the second node in response to receipt of the transmission packets, the return packets including a congestion signal reflection header having one or more return congestion signal values, and the return congestion signal values corresponding respectively to the congestion signal types; determining whether transmission rate control is necessary based on the return congestion signal values; and when transmission rate control is necessary, controlling a transmission rate for transmission of packets from the first node to the second node.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Overview

Figure 1:
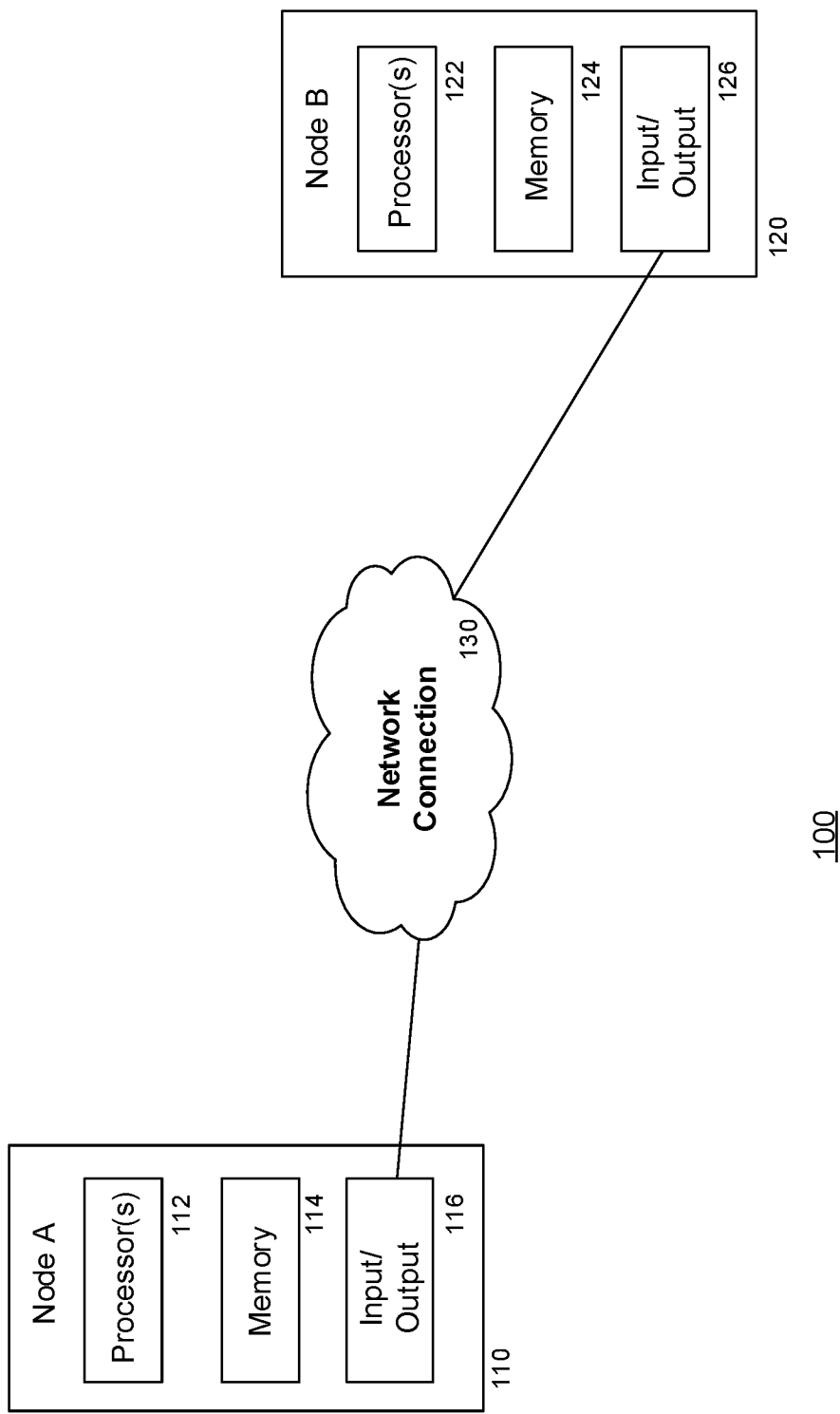
FIG. 1 illustrates an example communication network in which the presently disclosed technology is employed.

The currently disclosed technology concerns network congestion control through network congestion signals provided to network nodes at line rate. To this end, congestion signals of the technology are compare-and-replace style signals that are provided to nodes in the same packets as that of a running application. For example, congestion signals of the technology may be provided to a NIC hardware (H/W) transport within a server. In this manner, the NIC can enable support for congestion signaling on every packet, in hardware. Moreover, the congestion signal types for a connection between the NIC and another node may be determined by a rate update engine (RUE), and the NIC may receive and transmit the congestion signals from H/W to the RUE. The RUE may be implemented in hardware, software, or a combination of the two. The RUE may be programmable.

Using the presently disclosed technology, communication between network nodes can ramp up quickly to maximally use all network bandwidth and to complete close to the ideal time. For instance, the presently disclosed technology can provide for improved execution of transfer of data, for example in support of various workloads, including machine learning (ML) accelerated tasks. Further, a NIC as configured herein can enable multipath flows to choose paths with the most available bandwidth. The NIC can also offload valuable information for traffic engineering and/or debugging purposes, such as operational bottlenecks within a network.

Traffic Engineering (TE) also benefits from congestion control as described herein. In accordance with the presently disclosed technology, a NIC can identify congested points and flows experiencing congestion right away, which in turn can lead to more efficient and timely provisioning for bursty traffic. By contrast, inferring the congested flows through an offline process via superimposition of network traffic stats, topological information and routing information, has been a much longer process.

Aspects of the presently disclosed technology can also assist with debugging network level performance of datacenter applications. For instance, large scale applications including ML training workloads open thousands of connections at the transport layer, and upon a network slow-down identifying the bottleneck hops without joining many data sources across switches and hosts has been extremely difficult. However, with the present technology, because a node can receive path bottleneck characteristics, network choke points can be promptly identified which, in turn, leads to better bandwidth provisioning, timely repair processes, etc.

Technical advantages of the presently disclosed technology include explicit congestion signaling within a fleet of interconnected devices. The technology also allows for signaling of minimum available path bandwidth (or "bottleneck bandwidth") and load, which can be used for telemetry and congestion control purposes. In addition, the presently disclosed technology also provides for compare-and-replace support for congestion signaling between nodes at line rate, as well as reduced overhead for implementation relative to prior congestion control signaling techniques.

In some examples, programmable rate update engines can be adapted to receiving and processing diverse signal types. Support for congestion control (CC) and telemetry/debugging may be implemented in hardware, obviating the need to specify support in software. A rate update engine implemented as part of a NIC may be configured to support different signals specified by a congestion signal packet tag, on a per-connection basis, or a per-packet basis. In other words, the NIC may handle congestion control according to different parameters provided by tagged packets handled across multiple different connections. The congestion control is programmable and allows for efficiently communicating signals from a hardware transport to programmable software (S/W). The rate update engine can apply different signal types to outgoing packets.

In accordance with the presently disclosed technology, a NIC can be configured on a per-connection basis to support diverse types of congestion signals. The NIC can include an option to not provide congestion signals to outgoing packets, allowing the NIC to perform sampling within RTT time scales or to not insert congestion signals when the recipient device does not support the same type of congestion signaling.

A NIC according to the presently disclosed technology can support an array of entries corresponding to different congestion signal types. The NIC can dynamically choose indexes of the array of entries to enable congestion signaling of a particular type, and specify an initial value for the congestion signal. Once the NIC indicates an entry which is not equivalent to turning off congestion signaling, then the NIC would add in corresponding headers on every outgoing packet. Along the same lines, the NIC can disable congestion signaling by choosing the appropriate index.

Congestion signaling according to the presently disclosed technology may be used in a NIC/RUE on a per-connection basis for purposes of congestion control, telemetry, multipathing, load balancing and debuggability. The NIC/RUE can also make congestion signaling visible to an application stack, perhaps in some summarized way. Similarly, the NIC/RUE can summarize and make congestion signals visible to software-defined networking (SDN) systems, such as a traffic engineering controller.

Example Systems

Examples of systems and methods are described herein. It should be understood that the words "example." "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1 illustrates an example communication network 100 in which the presently disclosed technology is employed. The communication network 100 includes one or more nodes which may represent various computing devices connected to one another via a network connection. In the example of FIG. 1, a first node 110 and a second node 120 are shown as being connected via network connection 130. Each of the nodes 110, 120 may include a respective processor 112, 122, memory 114, 124, and communication device 116, 126 for receiving inputs and transmitting outputs. The processor 112, 122 can be a well-known type of processor or one of the lesser-known types of processors. Alternatively, the processor 112, 122 can be a dedicated controller such as an application-specific integrated circuit (ASIC), such as a Tensor Processing Unit (TPU). Further, the processor 112, 122 may, in some examples, be a type of GPU or field programmable gate array (FPGA).

The memory 114, 124 can store information accessible by the processor 112, 122, including data that can be retrieved, manipulated or stored by the processor, instructions that can be executed by the processor, or a combination thereof. The memory 114, 124 may be a type of non-transitory computer readable medium capable of storing information accessible by the processor 110, 120 such as a hard-drive, solid state drive, tape drive, optical storage, memory card, ROM, RAM, DVD, CD-ROM, write-capable, or read-only memories. In some examples, the memory 114, 124 is a type of physically stacked memory, or a type of high bandwidth memory (HBM).

Although FIG. 1 functionally illustrates the processor 112, 122 and corresponding memory 114, 124 of each node as being included within a single block, the processor and memory may actually include multiple processors and memories that may or may not be stored within the same physical housing. For example, some of the data and instructions can be stored on a removable CD-ROM and others within a read-only computer chip. Some or all of the instructions and data can be stored in a location physically remote from, yet still accessible by, the processor. Similarly, the processor can actually include a collection of processors, which may or may not operate in parallel.

The communication device 116, 126 for each node of the communication network may facilitate communication between the node and other remote devices that are in communication with the node. The remote devices may include other nodes of the communication network 100, one or more user devices in communication with the node, or any combination thereof. The communication device 116, 126 may be capable of transmitting data to and from other computers such as modems (e.g., dial-up, cable or fiber optic) and wireless interfaces. For example, each node may receive communications via the network connection 130, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

The network connection 130 between the nodes 110 120 of the communication network 100 may support multiple layers of communication protocols implemented by the respective processors 112, 122 of the nodes. For example, each node may support communication using an open systems interconnection (OSI) model. Further, congestion control signaling for an OSI connection between the nodes 110 and 120 may be implemented in packets of one or more running applications by tagging packets at various layers of the OSI connection between nodes 110 and 120.

Figure 2:
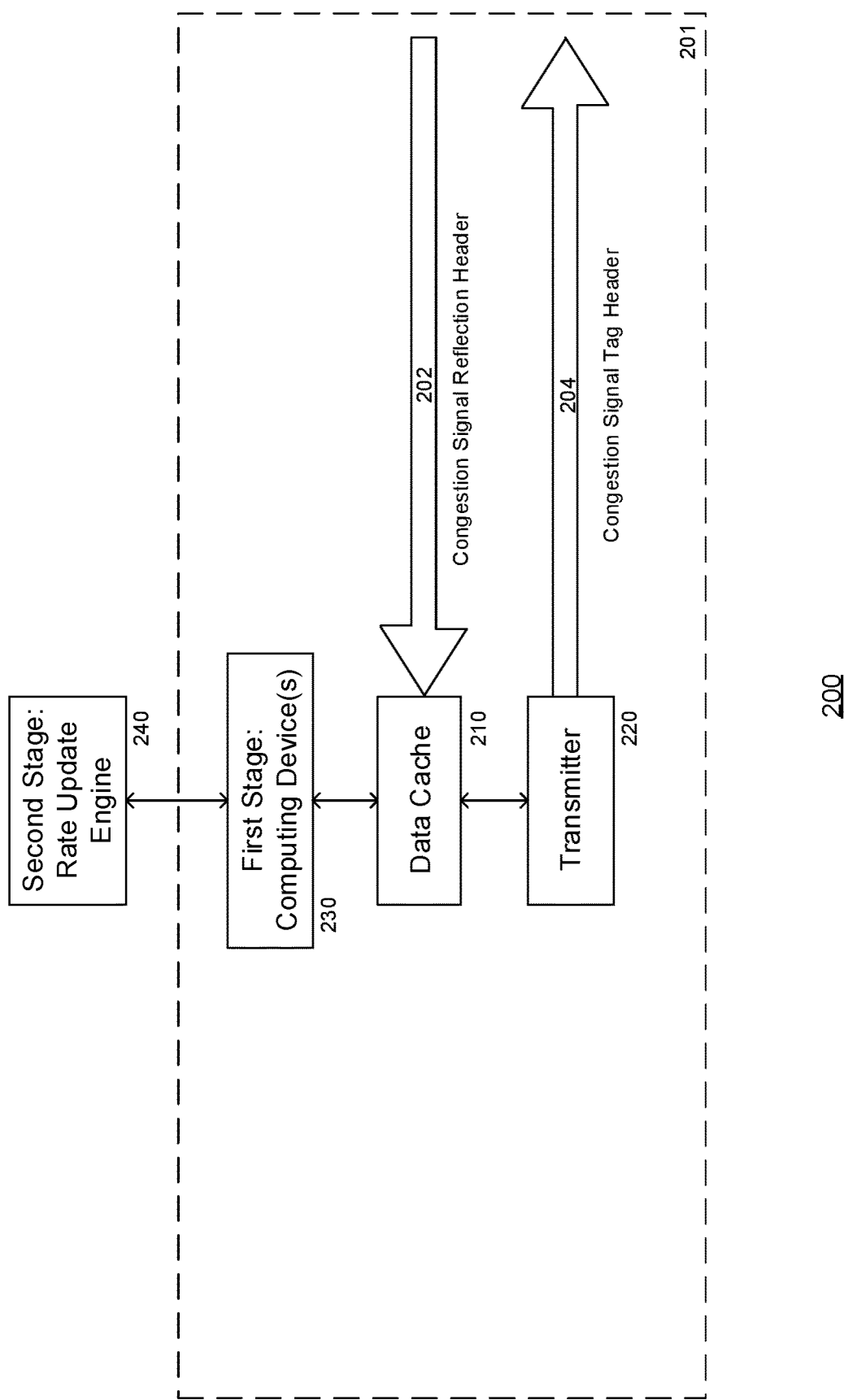
FIG. 2 is a block diagram of a system for congestion control within a communication network, such as the communication network of FIG. 1.

FIG. 2 is a block diagram of a system 200 for congestion control within a communication network, such as the communication network 100 of FIG. 1. The system 200 of FIG. 2 may be included in a first node of the communication network, such as Node A 110 of FIG. 110 of FIG. 1, and may or may not be included within a NIC of the first node. In any event, the system 200 may be configured to control congestion at a second node of the communication network, such as Node B 120 of FIG. 1, by gathering information from the second node, and possibly other nodes, and updating a rate of packet transmission to the second node based on the gathered information. In a more specific example, when a packet communication connection exists between Node A 110 and Node B 120, and packets are communicated between Node A 110 Node B 120 through intermediate nodes or devices (collectively "transit devices"), Node A 110 may collect congestion information from Node B 210 and/or from the transit devices through congestion signals carried in the packets.

As can be seen from FIG. 2, a main data path 201 is configured to transmit data between the first and second nodes bidirectionally. At the first node, a stream of incoming packets 202 may be received along the main data path 201 and temporarily stored at the memory of the first node, represented as data cache 210 in FIG. 2. A stream of outgoing packets 204 may be transmitted along the main data path 201 by the communication device of the first node, represented as a transmitter 220 in FIG. 2. The outgoing packets 204 may selectively include a configuration signal tag header, as noted in FIG. 2. For example, outgoing packets 204 (or "transmission packets") that are to be transmitted to a second node may be modified by one or more processors of the system 200 to add a congestion signal tag header to one or more of the transmission packets prior to transmission. The congestion signal tag header may specify one or more congestion signal types and, for each of the congestion signal types, specify an initial congestion signal value. Regarding the incoming packets 202, they may include one or more return packets generated by the second node in response to receipt of the transmission packets having the congestion signal tag header and including a congestion signal reflection header, as noted in FIG. 2. The congestion signal reflection header may include one or more return congestion signal values, with the return congestion signal values corresponding respectively to the congestion signal types.

The return packets received from the second node over the incoming stream 202 and stored at the data cache 210 may be analyzed to determine whether the rate of packet transmission to the second node should be updated. The analysis may be divided into two distinct stages. At a first stage, a determination is made as to which of the return congestion signal values should be selected for use in determining whether to initiate a rate update event. This first stage may be implemented using one or more computing devices 230 included in hardware of the first node and communicatively coupled to the main data path 201. At a second stage, a determination is made, based on the selected return congestion signal values, as to whether transmission rate control is necessary. When transmission rate control is necessary, the second stage controls a transmission rate for transmission of packets from the first node to the second node.

The second stage may be implemented using a rate update engine 240 that is separate from the main data path 201. For example, data from the incoming stream 201 may be stored separately from the data cache 210, and the rate update engine 240 may analyze the separately stored data in order to determine the updated parameters for data packet transmission. Separating the congestion control process between these two stages helps to offload processing from the main data path, and thus improves performance over the main data path. Other advantages of offloading the congestion control process include increased flexibility in defining the congestion control algorithm, and in at least some examples increased flexibility in controlling whether rate update events are initiated. These and other aspects of the two-stage congestion control process are described in greater detail herein.

It should be noted that in some embodiments both the first stage and second stage of return packet analysis may be performed by the RUE 240. That is, the RUE may be configured to determine which of the return congestion signal values should be selected for use in determining whether to initiate a rate update event, determine whether transmission rate control is necessary, and control the transmission rate for transmission of packets from the first node to the second node. In such embodiments the one or more computing devices 230 are not needed.

Having described the congestion control system 200 of FIG. 2, the congestion control signaling protocol and the congestion signals employed in system 200 will be described in more detail.

Two components in the packet header are used to achieve end-to-end congestion signaling and network congestion control. One component is the congestion signal tag header. The other component is the congestion signal reflection header. In some embodiments the congestion signal tag header is a header for a first layer protocol of an OSI model of a network, and the congestion signal reflection header is a header for a second layer protocol of the OSI model, wherein the first layer protocol is different from the second layer protocol. For instance, the first layer protocol may be lower than the second layer protocol. In a more specific example, the first layer protocol is an OSI level 2 protocol in which end hosts and transit devices participate, and the second layer protocol is an OSI level 4 protocol in which only end hosts participate. In other examples, the congestion signal tag header can be implemented in different ways consistent with a corresponding communication model used for communicating congestion signals between network devices.

Figure 3A:
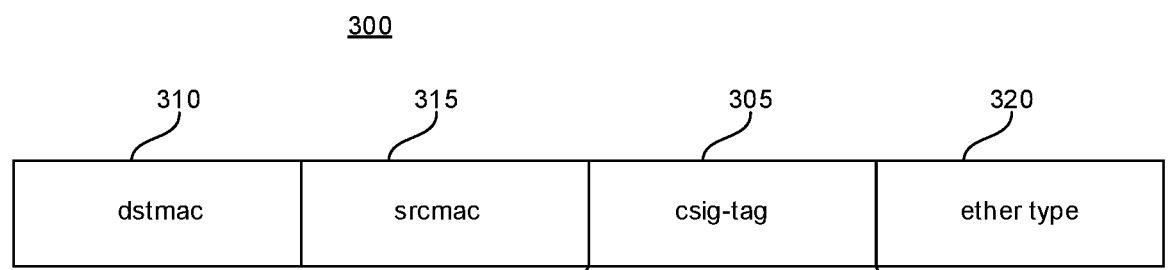
FIG. 3A shows an illustrative open systems interconnection (OSI) level 2 packet header after addition of a congestion signal tag header.
Figure 3B:
FIG. 3B shows an example of fields that may be included in the congestion signal tag header of the FIG. 3A header.
Figure 3C:
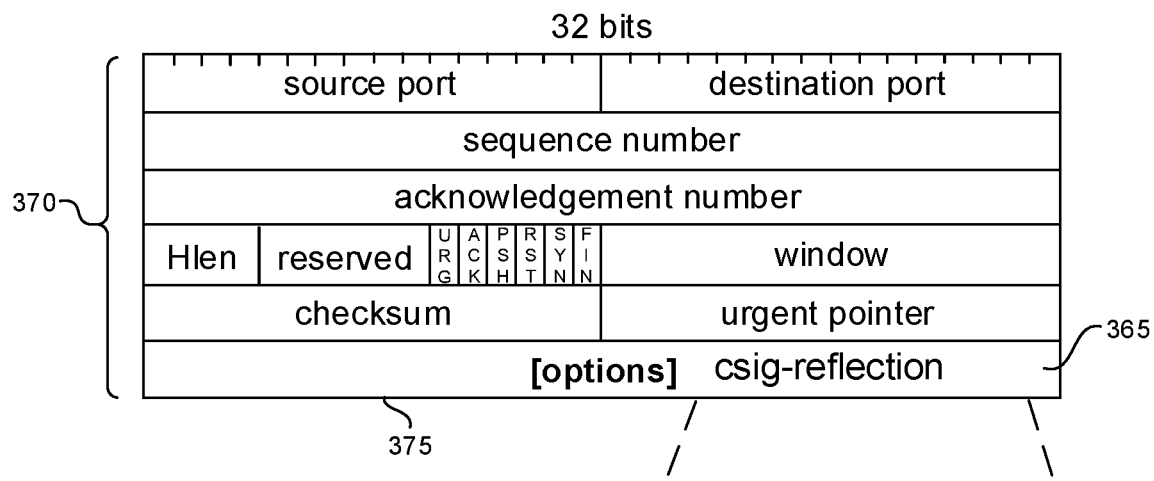
FIG. 3C shows an illustrative OSI level 4 packet header after addition of a congestion signal reflection header.
Figure 3D:
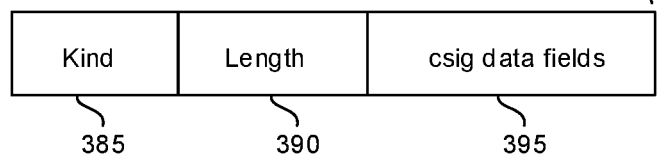
FIG. 3D shows an example of fields that may be included in the congestion signal reflection header of the FIG. 3C header.

To illustrate incorporation of the congestion signal tag header and the congestion signal reflection header into OSI packets in one example, FIGS. 3A to 3D are provided. FIG. 3A shows an illustrative OSI level 2 packet header 300 after addition of a congestion signal tag header. FIG. 3B shows an example of fields 330 that may be included in the congestion signal tag header of the FIG. 3A header. FIG. 3C shows an illustrative OSI level 4 packet header 360 after addition of a congestion signal reflection header. And, FIG. 3D shows an example of fields 380 that may be included in the congestion signal reflection header of the FIG. 3C header.

As can be seen from FIG. 3A, the packet header 300 includes a congestion signal tag header 305 as the last tag of the level 2 header 300. As can be further seen from FIG. 3A, other portions of the header 300 may include a destination media access control (MAC) address 310, a source MAC address 315, and an ether type 320.

The congestion signal tag header 305 may include one or more congestion signal types and one or more respective congestion signal values. The congestion signal types each indicate a type of signal being carried in the congestion signal tag and may each be, for example, three or four bits long. The congestion signal values each capture the value of the signal specified by the corresponding congestion signal type and may each be, for example, five or twenty bits long. The specific length of congestion signal types and their corresponding values can vary, for example, based on constraints or design requirements for the corresponding communication model for which the congestion signals are implemented.

In the example of FIG. 3B, the congestion signal tag header includes three fields, a tag protocol ID (TPID) field 335, a type (T) field 340, and a value (V) field 345. In such configuration, the TPID field 335 may be, for example, a sixteen bit field identifying the fields 330 as being part of a congestion signal tag header. The T field 340 may be, for example, a three bit field for indicating one of eight possible congestion signal types. The V field 345 may be, for example, a five bit field for indicating one of thirty-two possible values; and the values may be, for example, encoded values so that each encoded value may be decoded into a more recognizable value, such as a number of gigabits per second (Gbps).

Regarding congestion signal types, a sender host at a first node (e.g., node A 110 of FIG. 1) may set the signal types on a per-packet basis. Setting of the signal types is effectively a request for congestion signaling information. Multiple signal types may be supported. In some embodiments, a single packet can carry at most one congestion signal. However, a sender host may obtain multiple signals for a single flow (e.g., a five-tuple flow) by requesting different signal types on alternating packets of a flow or in a round-robin fashion across packets. Therefore, a sender host need not tie a single flow to a specific signal type, and may obtain all supported congestion signals for a single flow.

Regarding congestion signal values, a sender host at a first node (e.g., node A 110 of FIG. 1) may set the initial signal values. Each transit device along the packet path from the sender host to a receiver host at a second node (e.g., Node B 120 of FIG. 1), the sender host, and/or the receiver host, may modify the signal values in accordance with the end-to-end signal being computed. For example, for congestion signals that are min( ) aggregations, a sender host may set the initial congestion signal value to the maximum allowable value of the signal, and the transit devices may perform compare-and-replace so as to compute the min( ) across all devices on the packet path. In this manner, modification for each congestion signal value may involve comparing the congestion signal value to a local congestion signal value of the first node, the second node, and/or the transit device, and replacing the congestion signal value with the local congestion signal value when the local congestion signal value is one of (i) less than the congestion signal value, and (ii) greater than the congestion signal value.

Regarding the congestion signals in general, the signals may be aggregation functions of individual per-hop or per-port signals across the path of a packet. The typical definition of such signals with max/min aggregations captures the notion of a path bottleneck for different definitions of bottleneck. However, structurally, the format supports arbitrary aggregation functions including max, min, count and sum, allowing future use cases to leverage the structure for new signals. For purposes of brevity of description, this disclosure will illustrate the congestion signals by describing three types of congestion signals in more detail, a minimum available bandwidth congestion signal (min(ABW)), a maximum link utilization congestion signal (max(U/C) or min (ABW/C)), and a maximum per-hop delay congestion signal (max(PD)).

The min(ABW) captures the minimum absolute available bandwidth, in bits per second (bps), across all the ports in the packet path. The available bandwidth (ABW) is defined per egress port on each device. Further, the ABW can be computed using one of many algorithm variants, each having implications on HW or SW implementation complexity, timescales of computation, and accuracy of the signal.

The min(ABW/C) captures the link utilization bottleneck along the path of the packet, with ABW/C capturing the fraction or percentage of available bandwidth on a given link relative to the link's capacity. The min(ABW/C) is most relevant in paths with heterogeneous link speeds, where it distinguishes itself from min(ABW). The min(ABW/C) is equivalent to max(U/C), where U=utilization of a given egress port in bps, C=capacity of a given egress port in bps, and ABW=available bandwidth of a given egress port in bps. Therefore, max(U/C)=max (1−ABW/C)=1−min(ABW/C).

The max(PD) captures the maximum per-hop delay experienced by a packet among all the hops in the packet path. Per-hop delay (PD) is the time spent by the packet in the device pipeline. The PD may include link layer delays or may include only the delays observed in the forwarding pipeline. Unlike ABW and ABW/C which are per-port signals, PD is a per-packet signal. Device implementations may track ingress and egress timestamps explicitly for each packet and perform a diff in the final stages of the pipeline. Precise definitions of these stages depend on the architecture of the device. For example, some devices could leverage existing timestamping support from tail timestamping capabilities for this purpose.

Turning now to the congestion signal reflection header, it is noted that the congestion signal reflection header enables consumption of congestion signal values at the point where the signals are needed for telemetry or control. This mechanism is particularly relevant for sender-driven/source-based telemetry and control. For receiver-driven transports and controllers, the congestion signal reflection header may not be necessary as the signals defined in the congestion signal tag header are available at the receiver without reflection. Moreover, the location of the congestion signal reflection header and the choice of which packets carry the header are transport-specific. As an example, the congestion signal reflection header can be carried on transmission control protocol (TCP) acknowledge (ACK) packets from the receiver back to the sender. In any event, the congestion signal reflection header may include all of the congestion signals specified in the corresponding congestion signal header or, in the interest of optimizing header size, include only a subset of the congestion signals specified in the corresponding congestion signal header.

FIG. 3C shows an illustrative OSI level 4 packet header 360 after addition of a congestion signal reflection header 365. As can be seen from FIG. 3C, the packet header 360 may be a thirty-two bit wide TCP header 370 having a TCP options field 375. In the FIG. 3C configuration the congestion signal reflection header 365 is placed within the TCP options field 375.

FIG. 3D shows an example of fields 380 that may be included in the congestion signal reflection header 365. In the FIG. 3D example, the congestion signal reflection header includes three fields, a kind field 385, a length field 390, and congestion signal data fields 395. In such configuration, the kind field 385 may be, for example, an eight bit field identifying the fields 380 as being part of a congestion signal reflection header. The length field 390 may be, for example, an eight bit field indicating the length of the congestion signal data fields 395. And the congestion signal data fields 395 may be, for example, sixteen bits long and contain one or more congestion signal types and one or more respective congestion signal values.

Having described congestion control signaling according to embodiments, overall operation of embodiments will be described in additional detail.

In embodiments, congestion signaling operation may begin when a sender host constructs a congestion signal tagged packet for a flow of interest and sends out the packet with the congestion signal tag header fields initialized. The sender host (e.g., software running on a NIC of a first node) determines these initial values for the packet, including the one or more congestion signal types and the one or more initial congestion signal values. As the packet traverses through the network from the sender host to a receiver host (e.g., software running on a NIC of a second node), each of the first node, the second node, and the transit device(s) between the first node and second node may or may not perform a compare-and-replace on the congestion signal tag header to update the congestion signal values. That is, the congestion signal values may be updated by any one of (i) only the first node, (ii) only the second node, (iii) one or more of the transit devices, and (iv) any combination of (i), (ii), and (iii). As the packet traverses through the network, the congestion signal tag header accumulates the desired aggregation of the requested signals.

In some embodiments, a sender host and a receiver host exchange congestion related information through congestion signal types supported only by the sender host and the receiver host. In these embodiments, even without the network supporting certain signal types, any transit devices between the sender host and receiver host can act pass-through while the sender host and receiver host exchange end-point specific congestion information. For example, a NIC of a sender node and a NIC of a receiver node may exchange congestion signals regarding the packets per second (PPS) bandwidth available at the receiver node, and/or the unoccupied buffer space/credits at the receiver node. In another example, a NIC of a receiver node may use congestion signals to indicate to a NIC of a sender node the number of buffer slots remaining at the receiver node, the receiver node's desired rate of transmission for sender-to-receiver packets, or some other value.

In any event, when the congestion signal tagged packet reaches a receiver host, the data fields in the congestion signal tag header are extracted and delivered to a transport layer at the receiver host. The receive host, e.g., software running on a NIC of a second node, stores the congestion signal types and congestion signal values of the packet to be reflected, or a summary of these types and values across packets, and reflects these types and values in a congestion signal reflection header on packets traversing the reverse path from the receiver host to the sender host. The congestion signal reflection header is unmodified as the packet travels from the receiver host to the sender host. The sender host extracts the congestion signal types and values from the congestion signal reflection header of the incoming packet, and hands the types and values to the transport layer of the sender host for use in applications at the sender host. As a result, the sender host learns the desired signal for a flow within approximately one round-trip time.

If a sender host desires to obtain multiple signals for the same flow, it may choose congestion signal types on a per-packet basis. For example, the sender host may choose congestion signal types in a round-robin fashion across the flow's packets, and internally keep track of all of the requested congestion signal types as part of the flow's state variables. This approach allows the sender host transport to use all supported congestion signal types for use cases such as congestion control, load balancing, and/or multipathing.

Figure 4:
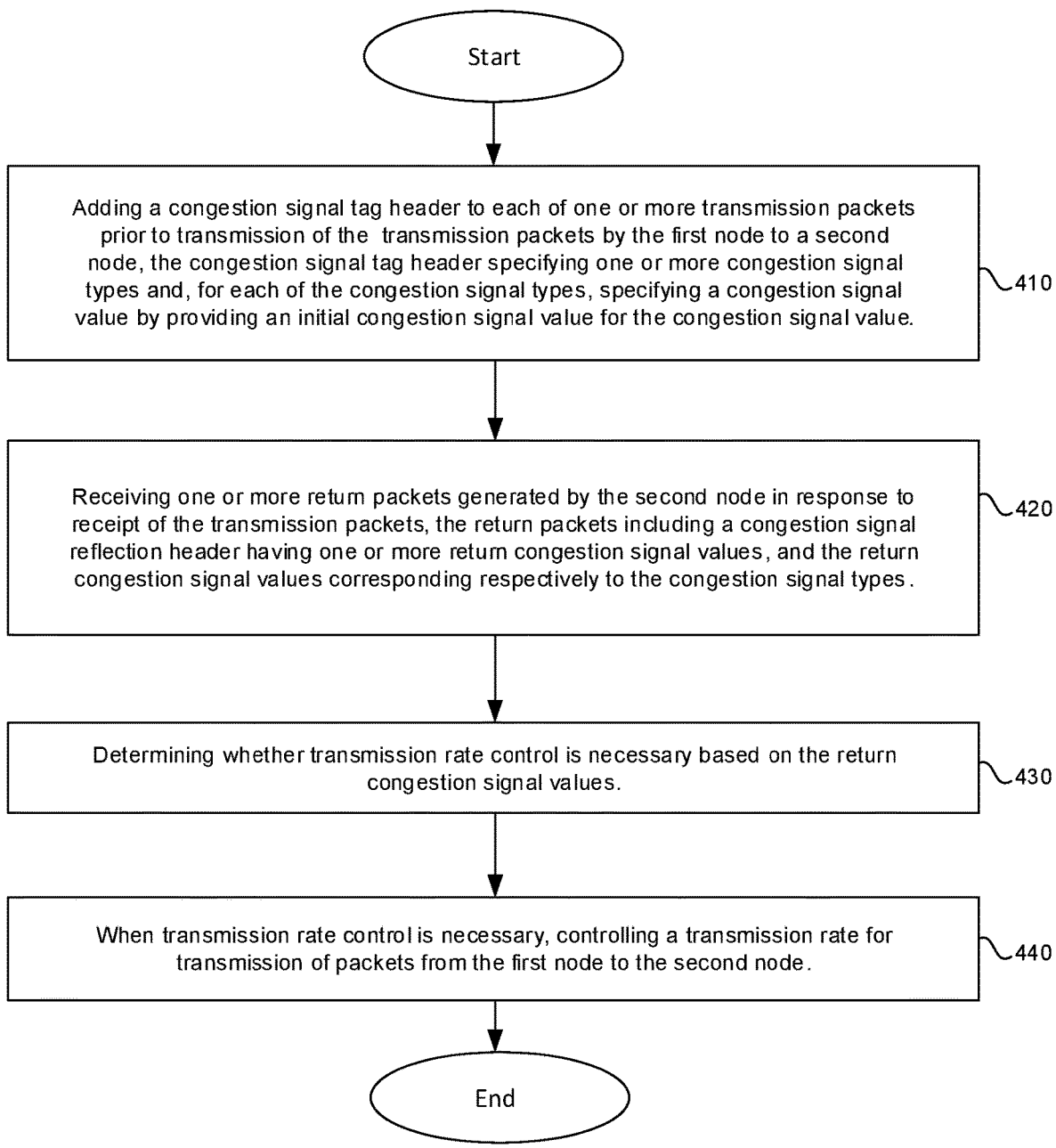
FIG. 4 is a flow chart depicting an illustrative process for performing congestion control according to the presently disclosed technology.

Referring now to FIG. 4, there is shown a flow chart depicting an illustrative process 400 for performing congestion control according to the presently disclosed technology. As can be seen from FIG. 4, a first step of the illustrative process is that of adding a congestion signal tag header to each of one or more transmission packets prior to transmission of the transmission packets by the first node to a second node, the congestion signal tag header specifying one or more congestion signal types and, for each of the congestion signal types, specifying a congestion signal value by providing an initial congestion signal value for the congestion signal value (step 410). The next step is that of receiving one or more return packets generated by the second node in response to receipt of the transmission packets, the return packets including a congestion signal reflection header having one or more return congestion signal values, and the return congestion signal values corresponding respectively to the congestion signal types (step 420). Then follows an operation of determining whether transmission rate control is necessary based on the return congestion signal values (step 430). And, when transmission rate control is necessary, the process proceeds to an operation of controlling a transmission rate for transmission of packets from the first node to the second node (step 440).

Embodiments of the present technology include, but are not restricted to, the following.

(1) A congestion control system including one or more processors of a first node, the one or more processors configured to control adding a congestion signal tag header to each of one or more transmission packets prior to transmission of the transmission packets by the first node to a second node, the congestion signal tag header specifying one or more congestion signal types and, for each of the congestion signal types, specifying an initial congestion signal value by providing an initial congestion signal value for the congestion signal value; receiving one or more return packets generated by the second node in response to receipt of the transmission packets, the return packets including a congestion signal reflection header having one or more return congestion signal values, and the return congestion signal values corresponding respectively to the congestion signal types; determining whether transmission rate control is necessary based on the return congestion signal values; and when transmission rate control is necessary, controlling a transmission rate for transmission of packets from the first node to the second node.

(2) The system according to (1), wherein one or more of the return congestion signal values are different from the respective initial congestion signal values.

(3) The system according to (2), wherein the one or more of the return congestion signal values that are different from the respective congestion signal values are generated according to modification of the respective initial congestion signal values by at least one of the first node, the second node, or a transit device through which the transmission packets pass when transmitted from the first node to the second node.

(4) The system according to (3), wherein modification of the respective congestion signal values includes, for each respective congestion signal value, comparing the congestion signal value to a local congestion signal value of the first node, the second node, or the transit device, and replacing the congestion signal value with the local congestion signal value when the local congestion signal value is one of less than the congestion signal value or greater than the congestion signal value.

(5) The system according to (4), wherein replacing the congestion signal value includes changing the congestion signal tag header of the transmission packet having the congestion signal value by substituting the local congestion signal value for the congestion signal value without changing a size of the congestion signal tag header.

(6) The system according to (3), wherein modification of the respective congestion signal values is performed by the second node only.

(7) The system according to (1), wherein the congestion signal tag header is a header for a first layer protocol of an open systems interconnection (OSI) model of a network, and the congestion signal reflection header is a header for a second layer protocol of the OSI model, wherein the first layer protocol is different from the second layer protocol.

(8) The system according to (7), wherein the first layer protocol is lower than the second layer protocol.

(9) The system according to (1), wherein the congestion signal types include at least one of a minimum available bandwidth (min(ABW)), a minimum available bandwidth per unit of capacity (min(ABW/C)), a maximum utilization per unit of capacity (max(U/C)), or a maximum per-hop delay (max(PD)).

(10) The system according to (1), wherein the one or more processors are part of a network interface card (NIC).

(11) The system according to (10), wherein the NIC includes a rate update engine (RUE) configured to determine the one or more congestion signal types to be added to each of the congestion signal tag headers, and when transmission rate control is necessary, generate a congestion control result based on selected one or more of the return congestion signal values, and perform the controlling of the transmission rate for transmission of packets from the first node to the second node based on the congestion control result.

(12) The system according to (11), wherein the RUE is configured to determine the selected one or more of the return congestion signal values, and to perform the determining whether transmission rate control is necessary.

(13) The system according to (11), wherein the NIC further includes one or more first stage computing devices, and the one or more first stage computing devices are configured to determine the selected one or more of the return congestion signal values, and to perform the determining whether transmission rate control is necessary.

(14) A congestion control method including adding a congestion signal tag header to each of one or more transmission packets prior to transmission of the transmission packets by the first node to a second node, the congestion signal tag header specifying one or more congestion signal types and, for each of the congestion signal types, specifying a congestion signal value by providing an initial congestion signal value for the congestion signal value; receiving one or more return packets generated by the second node in response to receipt of the transmission packets, the return packets including a congestion signal reflection header having one or more return congestion signal values, and the return congestion signal values corresponding respectively to the congestion signal types; determining whether transmission rate control is necessary based on the return congestion signal values; and when transmission rate control is necessary, controlling a transmission rate for transmission of packets from the first node to the second node.

(15) The method according to (14), wherein one or more of the return congestion signal values are different from the respective initial congestion signal values.

(16) The method according to (15), wherein the one or more of the return congestion signal values that are different from the respective initial congestion signal values are generated according to modification of the respective congestion signal values by at least one of the first node, the second node, or a transit device through which the transmission packets pass when transmitted from the first node to the second node.

(17) The method according to (16), wherein modification of the respective congestion signal values includes, for each respective congestion signal value, comparing the congestion signal value to a local congestion signal value of the first node, the second node, or the transit device, and replacing the congestion signal value with the local congestion signal value when the local congestion signal value is one of less than the congestion signal value or greater than the congestion signal value.

(18) The method according to (17), wherein replacing the congestion signal value includes changing the congestion signal tag header of the transmission packet having the congestion signal value by substituting the local congestion signal value for the congestion signal value without changing a size of the congestion signal tag header.

(19) The method according to (14), wherein the congestion signal tag header is a header for a first layer protocol of an open systems interconnection (OSI) model of a network, and the congestion signal reflection header is a header for a second layer protocol of the OSI model, wherein the first layer protocol is different from the second layer protocol.

(20) The method according to (19), wherein the first layer protocol is lower than the second layer protocol.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A congestion control system comprising:
one or more processors of a first node, the one or more processors configured to control:
adding a congestion signal tag header to each of one or more transmission packets prior to transmission of the one or more transmission packets by the first node to a second node, the congestion signal tag header specifying one or more congestion signal types and, for each of the congestion signal types, specifying a congestion signal value by providing an initial congestion signal value for the congestion signal value, wherein for each of the one or more transmission packets the corresponding one or more congestion signal types are selectable among a plurality of congestion signal types including at least one of a minimum available bandwidth (min (ABW)), a minimum available bandwidth per unit of capacity (min(ABW/C)), or a maximum per-hop delay (max(PD));
receiving one or more return packets generated by the second node in response to receipt of the transmission packets, the one or more return packets including a congestion signal reflection header comprising one or more return congestion signal values, and the one or more return congestion signal values corresponding respectively to the congestion signal types;
determining whether transmission rate control is necessary based on the return congestion signal values; and
when the transmission rate control is necessary, controlling a transmission rate for transmission of packets from the first node to the second node.

2. The system according to claim 1, wherein one or more of the return congestion signal values are different from the respective initial congestion signal values.

3. The system according to claim 2, wherein the one or more of the return congestion signal values that are different from the respective initial congestion signal values are generated according to modification of the respective congestion signal values by at least one of the first node, the second node, or a transit device through which the transmission packets pass when transmitted from the first node to the second node.

4. The system according to claim 3, wherein modification of the respective congestion signal values comprises, for each respective congestion signal value, comparing the congestion signal value to a local congestion signal value of the first node, the second node, or the transit device, and replacing the congestion signal value with the local congestion signal value when the local congestion signal value is one of less than the congestion signal value or greater than the congestion signal value.

5. The system according to claim 4, wherein replacing the congestion signal value comprises changing the congestion signal tag header of the transmission packet having the congestion signal value by substituting the local congestion signal value for the congestion signal value without changing a size of the congestion signal tag header.

6. The system according to claim 3, wherein modification of the respective congestion signal values is performed by the second node only.

7. The system according to claim 1, wherein the congestion signal tag header is a header for a first layer protocol of an open systems interconnection (OSI) model of a network, and the congestion signal reflection header is a header for a second layer protocol of the OSI model, wherein the first layer protocol is different from the second layer protocol.

8. The system according to claim 7, wherein the first layer protocol is lower than the second layer protocol.

9. The system according to claim 1, wherein the one or more processors are part of a network interface card (NIC).

10. The system according to claim 9, wherein the NIC comprises a rate update engine (RUE) configured to
determine the one or more congestion signal types to be added to each of the congestion signal tag headers, and
when the transmission rate control is necessary, generate a congestion control result based on selected one or more of the return congestion signal values, and perform the controlling of the transmission rate for transmission of packets from the first node to the second node based on the congestion control result.

11. The system according to claim 10, wherein the RUE is configured to determine the selected one or more of the return congestion signal values, and to perform the determining whether the transmission rate control is necessary.

12. The system according to claim 10, wherein the NIC further comprises one or more first stage computing devices, and the one or more first stage computing devices are configured to determine the selected one or more of the return congestion signal values, and to perform the determining whether the transmission rate control is necessary.

13. A congestion control method comprising:
adding a congestion signal tag header to each of one or more transmission packets prior to transmission of the one or more transmission packets by a first node to a second node, the congestion signal tag header specifying one or more congestion signal types and, for each of the congestion signal types, specifying a congestion signal value by providing an initial congestion signal value for the congestion signal value, wherein for each of the one or more transmission packets the corresponding one or more congestion signal types are selectable among a plurality of congestion signal types including at least one of a minimum available bandwidth (min(ABW)), a minimum available bandwidth per unit of capacity (min(ABW/C)), or a maximum per-hop delay (max(PD));

receiving one or more return packets generated by the second node in response to receipt of the transmission packets, the one or more return packets including a congestion signal reflection header comprising one or more return congestion signal values, and the one or more return congestion signal values corresponding respectively to the congestion signal types;

determining whether transmission rate control is necessary based on the return congestion signal values; and when the transmission rate control is necessary, controlling a transmission rate for transmission of packets from the first node to the second node.

14. The method according to claim 13, wherein one or more of the return congestion signal values are different from the respective initial congestion signal values.

15. The method according to claim 14, wherein the one or more of the return congestion signal values that are different from the respective initial congestion signal values are generated according to modification of the respective congestion signal values by at least one of the first node, the second node, or a transit device through which the transmission packets pass when transmitted from the first node to the second node.

16. The method according to claim 15, wherein modification of the respective congestion signal values comprises, for each respective congestion signal value, comparing the congestion signal value to a local congestion signal value of the first node, the second node, or the transit device, and replacing the congestion signal value with the local congestion signal value when the local congestion signal value is one of less than the congestion signal value or greater than the congestion signal value.

17. The method according to claim 16, wherein replacing the congestion signal value comprises changing the congestion signal tag header of the transmission packet having the congestion signal value by substituting the local congestion signal value for the congestion signal value without changing a size of the congestion signal tag header.

18. The method according to claim 13, wherein the congestion signal tag header is a header for a first layer protocol of an open systems interconnection (OSI) model of a network, and the congestion signal reflection header is a header for a second layer protocol of the OSI model, wherein the first layer protocol is different from the second layer protocol.

19. The method according to claim 18, wherein the first layer protocol is lower than the second layer protocol.

\* \* \* \* \*